(12) United States Patent
Kalinsky

(10) Patent No.: US 6,510,769 B1
(45) Date of Patent: Jan. 28, 2003

(54) PICK-UP AND BACK MACHINING SYSTEM FOR A MULTI-SPINDLE MACHINE

(75) Inventor: Robert M. Kalinsky, Broadview Heights, OH (US)

(73) Assignee: Logan Clutch Corporation, Westlake, OH (US)

( * ) Notice: Subject to any disclaimer, the term of this patent is extended or adjusted under 35 U.S.C. 154(b) by 47 days.

(21) Appl. No.: 09/804,281

(22) Filed: Mar. 12, 2001

Related U.S. Application Data

(60) Provisional application No. 60/188,726, filed on Mar. 13, 2000.

(51) Int. Cl.[7] ............................. B23B 13/00; B23B 9/00
(52) U.S. Cl. ............................... 82/47; 82/124; 82/129
(58) Field of Search ..................... 82/1.11, 46, 47, 82/129, 124

(56) References Cited

U.S. PATENT DOCUMENTS 5,901,624 A  *  5/1999  Shiramasa .................. 269/14
5,946,993 A  *  9/1999  Flanagan .................... 82/1.11

\* cited by examiner

Primary Examiner—Jacob K. Ackun
(74) Attorney, Agent, or Firm—Ralph E. Jocke; Daniel D. Wasil; Walker & Jocke

(57) ABSTRACT

A multi-spindle machine system includes a pick-up attachment. Both the rotational and the axial positions and speeds of the pick-up spindle may be selectively controlled. A plurality of clutches may be used to rotate the pick-up spindle at different speeds. The clutches operatively engage respective drive gears to drive the pick-up spindle. A brake may be used to slow or stop the pick-up spindle. A servo motor may alternatively be used to rotate the pick-up spindle at different speeds. Another servo motor may be used to axially position the pick-up spindle at different locations. The pick-up attachment of the system of the present invention provides selective programmable control of the movements of a pick-up spindle during work piece pickup, back machining, and dropping operations.

22 Claims, 9 Drawing Sheets

PICK-UP AND BACK MACHINING SYSTEM FOR A MULTI-SPINDLE MACHINE

This application claims benefit of Ser. No. 60/188,726 filed Mar. 13, 2000, now abandoned.

TECHNICAL FIELD

This invention relates in general to multi-spindle machines. Specifically, this invention relates to a multi-spindle machine having attachments for pick-up and back machining operations.

BACKGROUND ART

Multi-spindle machines are known in the prior art. Multi-spindle machines are used to mass produce standardized types of components. A multi-spindle machine typically has several work stations at which machining operations are performed. A piece of raw stock, such as a bar stock, enters the machine at a first station and as the machine indexes, various machining operations are performed. Once the station is indexed completely through the machine, a completed part is formed. The part is released, and the process is repeated for that station with a new piece of raw stock. An advantage of multi-spindle machines is that all stations in the machine are producing parts simultaneously, resulting in high production.

Multi-spindle machines (also referred to as multiple spindle machines) typically have a large indexing spindle drum with four, five, six or eight work spindle stations thereon. Each of the stations carries a work piece. Generally in all but one of the stations, where a new piece of stock enters, a machining operation is performed. After each machining operation is completed, the drum is rotated so that each work piece moves sequentially through the locations where the various machining operations are performed. Machining operations that are typically performed at a multi-spindle machine include milling, turning, and threading.

Most multi-spindle machines are very efficient in terms of producing standardized parts at a high rate. However, one drawback associated with a multi-spindle machine is that the entire machine operates off of a single main motor. The main motor simultaneously drives all of the devices and processes in the machine. Multi-spindle machines typically include one or more timing shafts with cams for the coordination of multiple machine operations.

There is always a risk that one of the mechanisms within the machine will not function properly. If such a malfunction should occur and not be detected by an operator in time to shut the machine off, the machine will continue with its next cycle. In such a case, an attempt by the machine to index to its next position could cause severe damage. This is why it is common for an operator to be required to closely monitor multi-spindle machines.

Typically, the speed of multi-spindle machines changes from high to low speed and back again during the course of the operating cycle. High speed is normally used for times in the machine cycle when critical machining operations are not occurring. High speed operation is desirable when the stations are indexing, or when the tools are moving toward or away from the work pieces and are not performing work thereon. Low speed operation is generally used when the tools in the machine are forming the metal. Any attempt to operate the machine at a high speed when such forming work is being performed is likely to cause a problem or jam the machine.

In many multi-spindle machines at the final station the completed work piece is cut off from the stock. The completed work piece is dropped onto a conveyor or other device to move it away from the machine. It is common to have to perform additional operations on the completed part before it is ready for use. These additional operations are often done by hand or in other machines and add substantial cost to making the part. In many machines the movement of the work piece after cut off is unpredictable and may result in nicks on the ejected work piece. Therefore, work pieces sometimes become damaged and unusable. Furthermore, because the work piece is released from a rotating collet, large work piece catchers are required in order to ensure catching of the falling work pieces. Additionally, the large catchers have to be situated in a crowded tool zone, which often makes it difficult to control the cut off part and avoid damage to parts and other machine components.

In some multi-spindle machines pick-up attachments are available for pick-up of work pieces in the station where the completed work piece is cut off from the stock. Sometimes back machining operations in which a single minor back machining operation after cut off, such as finishing, reaming, chamfering, recessing, and deburring is performed by the machine. A pick-up attachment may include a dead length collet type with the collet operated by twin toggles controlled by a special cam mounted on the main camshaft in front of the main drive housing. The collet may be attached to a pick-up spindle. A pick-up collet is able to grip and eject the work piece. The movement of the pick-up attachments is typically set with the timing of the multi-spindle machine.

The pick-up spindle has one rotational speed which is generally mechanically gear driven. The rotational speed is set one to one with the spindle speed. During a pick-up operation, the pick-up spindle with the collet is moved axially up to the workpiece and is rotated at the same speed as the workpiece. The collet is moved over the work piece to hold it so that the work piece may be cut off. Later the work piece may be dropped in a relatively controlled manner from the pick-up spindle. However because the pick-up spindle is rotating the work piece there is still often difficulty preventing damage to work pieces and machine components when the part is released by the pick-up spindle.

The axial movement of the pick-up spindle is generally controlled by mechanically driven cams and levers. Timing changes are difficult because a mechanical cam must be altered or adjusted. Movement is limited by the travel of the cams and related levers. The cam actuated movement of a pick-up spindle is often restricted to less travel than would be desirable. Often the limited ability to control and move the pick-up spindle necessitates that additional operations on parts be done in subsequent operations in other machines or by hand.

In a back machining or forming operation of the prior art multi-spindle machines the pick-up and back machining operations are controlled by the mechanical cams and actuating devices in the machine. Thus, back machining operations are limited. Every work piece is picked up at the same position and speed, and any back machining operation is done at the spindle speed of the spindle from which the part has separated by the cut off operation. The operations are repeatedly performed based on the multi-spindle machine's timing device. The pick-up spindle collet is constantly rotating at the speed of the work piece collet. This pick-up collet is axially driven by cams and levers to position the collet over the work piece held by the work spindle. The pick-up spindle collet grippingly engages the work piece which is then cut from the remaining stock. The rotating or spinning work piece may then have a back machining operation performed thereon. An ejector plunger may be used for removal of the work piece from the pick-up spindle. The pick-up spindle is axially retracted toward a stationary ejector plunger so that the work piece is pushed out of the pick-up collet by the ejector plunger. However, the work piece is ejected from the collet while it is still rotating. Therefore, large work piece catchers are required to catch the ejected rotating work piece because of its unpredictable drop location.

A disadvantage with the prior art multi-spindle machines is that the rotational speed and the axial movement of the pick-up spindle are limited. Thus, the types and character of back machining operations are limited. For example, because the prior art pick-up spindle is constantly rotating, the drilling of a hole transversely through the work piece while it is held in the machine is not readily achievable. Similarly the performance of multiple back machining operations in the multi-spindle machine after part cut off is not achievable because of the limited ability to control part position and machining speeds.

Another disadvantage with prior art multi-spindle machines is that the axial and rotational pick-up position of the collet cannot be variably selected. Nor is the pick-up position always consistent and reliable. This leads to inconsistent back machining operations on the work pieces.

There exists a need for a multi-spindle machine having an arrangement that can overcome the disadvantages associated with the prior art pick-up and back machining operations. Thus, there exists a need for a multi-spindle machine having a system that can perform pick-up and back machining operations at controlled variable speeds and with a wider range of controlled part movements. Particularly, such a system would be preferably suited for retrofit on a Wickman, National Acme and New Britain multi-spindle machine.

DISCLOSURE OF INVENTION

It is an object of the present invention to provide a multi-spindle machine with improved pick-up and back machining operations.

It is a further object of the present invention to provide a multi-spindle machine with a pick-up spindle that may be driven at variable rotational speeds clockwise and counter-clockwise.

It is a further object of the present invention to provide a multi-spindle machine with a pick-up spindle that may be rotationally stopped.

It is a further object of the present invention to provide a multi-spindle machine with a pick-up spindle that may be driven to variably selected linear axial positions.

It is a further object of the present invention to provide a multi-spindle machine with a pick-up spindle that may be driven at variable linear axial speeds.

It is a further object of the present invention to provide a multi-spindle machine with a pick-up spindle that may be stopped in a selected linear axial position.

It is a further object of the present invention to provide a multi-spindle machine with a pick-up spindle that may be stopped in a selected rotational orientation position.

It is a further object of the present invention to provide a multi-spindle machine having a system that can perform pick-up and back machining operations at selectively variable rotational and axial speeds and movements.

It is a further object of the present invention to provide a multi-spindle machine capable of being retrofit to enhance the pick-up and back machining operations.

Further objects of the present invention will be made apparent following the Best Modes for Carrying Out Invention and the appended claims.

The foregoing objects of the present invention are accomplished by a multi-spindle machine that performs pick-up and back machining operations. The multi-spindle machine has a pick-up attachment including a pick-up spindle and collet. The pick-up spindle has variable rotation capabilities. The pick-up spindle may be rotationally driven at different speeds. For example, the pick-up spindle may be rotationally driven at either of two speeds. One speed may be matched one to one with the work spindle for "zero" relative speed, such as for use in initially gripping the work piece during cut off. The second speed may be at a useful ratio of the zero relative speed, such as a speed that may be better suited to further machining operations. The capability of using a second speed enhances the capability of the machine to perform back machining operations. A brake may be used to stop the pick-up spindle. With the pick-up spindle stopped, the collet may be opened and the part ejected more reliably and accurately. This reduces the risk of damage to the parts and to components of the machine.

In embodiments of the invention the pick-up spindle may be rotationally driven using plural driving gears with respective clutches, and a brake. The arrangement of different gears enables the pick-up spindle drive shaft to be selectively rotationally driven at different speeds. As previously discussed, one speed may be useful for initially gripping the work piece, another speed may be useful in back machining operations. The clutches enable the gears to be operatively engaged or disengaged in driving relation with the pick-up spindle shaft.

The arrangement of different gears, clutches, and brake may be operatively controlled by a controller. The controller may be operatively connected to one or more movement synchronization sensors such as an encoder. The encoder may be arranged on the multi-spindle machine so that it can be used by the controller to determine which speed to drive the pick-up spindle collet. For example, the controller may be used to engage a clutch to match the speed of the drive shaft with the speed of the work spindle collet. Thus, the pick-up collet may be rotated at the same speed as the work spindle collet and thus the work piece. The controller may then disengage the first clutch and engage another clutch to drive the pick-up spindle at a speed suitable for a back machining operation. Of course the controller may be used to perform other functions. For example the controller may operate to disengage the clutches and to engage the brake. The brake enables the pick-up spindle to be stopped. With the pick-up spindle stopped the pick-up collet may be opened and the completed work piece may be ejected.

In alternative embodiments the pick-up spindle may also be rotationally driven using a motor arrangement, such as a servo motor or an air motor. A brake may also be used. The servo motor is operated responsive to a controller and is able to rotationally drive the pick-up spindle shaft at different speeds. As previously discussed, one speed may be useful for initially gripping the work piece, while other speeds may be useful in back machining operations. The servo motor may be placed in operative connection with the pick-up spindle drive shaft to move it at a plurality of rotational speeds responsive to the controller. The controller may be operatively connected to one or more movement synchronization sensors such as an encoder. The encoder may be arranged on the multi-spindle machine so that it can be used by the controller to determine the speed of the work piece holding collet. The controller is able to control the speed of the pick-up spindle electronically. Hence, the controller is able to match the speed of the servo motor with the speed of the work spindle collet. Thus, the pick-up collet may be rotated at the same speed as the work spindle collet and thus the work piece during part cut off. Of course the controller may be used for other purposes. The controller which controls rotational movement of the pick-up spindle may also be operatively connected to a brake. The brake enables the pick-up spindle to be stopped. During stoppage of the pick-up spindle the pick-up collet may be opened and the work piece component may be ejected.

The pick-up spindle may be linearly driven along its axis of rotation responsive to the controller. This may be done using a drive mechanism which is selectively movable. The drive mechanism may include air cylinders with solenoids and a programmable electronic output device. In an exemplary embodiment the drive mechanism includes a servo motor. The servo motor is able to axially position the pick-up collet and the work piece engaged therewith at different locations. The servo motor is also able to axially move the pick-up spindle shaft at different speeds. The different locations to which the pick-up spindle is moved may include a plurality of back machining stations and a work piece drop station. The controller may be operatively connected to an encoder arranged on the multi-spindle machine or other device suitable for sensing the axial position of the pick-up spindle. The controller is operative responsive to signals from the encoder to control the servo motor. Thus, the controller is able to control the axial movement of the pick-up spindle. Hence, the controller is able to determine and control the axial speed and position of the pick-up collet during pick-up operations and back machining operations. Of course the controller may be used for other purposes. The controller for the linear movement of the pick-up spindle may be operatively connected to one or more electronic output devices. Such outputs may operate to control other components of the multi-spindle machine.

It should be understood that in other embodiments of the invention a pick-up spindle may be moved responsive to other axially positioning devices. However, a motor, such as a servo motor, can be used to more accurately control the positioning of the pick-up spindle. Furthermore, use of a motor provides more accurate control of the axial speed of the pick-up spindle.

An exemplary embodiment of a multi-spindle machine performing pick-up and back machining operation of the present invention, may include the following steps: matching the rotational speed of the pick-up collet with the speed of the work spindle collet; positioning the pick-up collet over the work piece; grasping the work piece with the pick-up collet; cutting the work piece from the remaining stock; adjusting the rotational speed of the work piece; axially moving the work piece to a back machining position; back machining the work piece; axially moving the work piece to an eject position; stopping the rotational speed of the work piece; and ejecting the work piece into a work piece catcher. The method may further include controlling the axial speeds and rotational positions of the work piece as operations are performed. Of course it should be understood that the rotational and the axial movements and speeds of the pick-up spindle may be controlled as necessary to perform the desired pick-up, back machining, and drop operations.

BEST MODES FOR CARRYING OUT INVENTION

As previously discussed, the prior art multi-spindle machines have less than desirable capabilities for controlling part pick-up and back machining operations. This has resulted due to the inability to adjust and control rotational speeds and axial positions of pick-up spindles. The present invention overcomes the disadvantages of the prior art.

In an exemplary embodiment of the present invention both the rotational and the axial speed and position of a pick-up spindle may be selectively controlled. Alternatively, in other exemplary embodiments of the present invention the rotational speed of the pick-up spindle may be selectively controlled while the positions of the pick-up spindle are controlled by prior art cam mechanisms in the multi-spindle machine. Alternatively, in other exemplary embodiments of the present invention the axial position and/or speed of the pick-up spindle is controlled while rotational speed for the pick-up spindle is set by the prior art gear train in the multi-spindle machine.

Figures 1, 2:
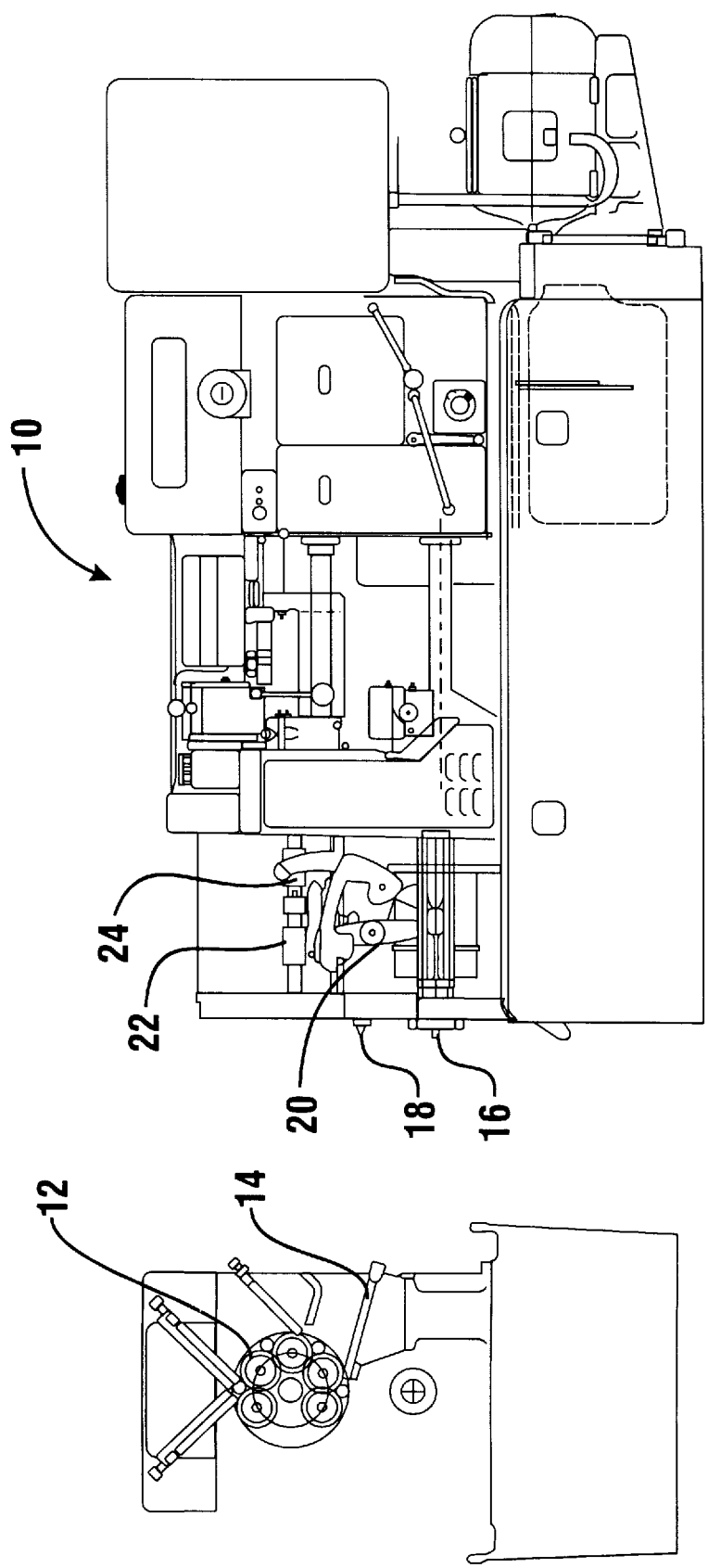
FIG. 1 shows a prior art multi-spindle machine.
FIG. 2 shows a side view of the prior art multi-spindle machine of FIG. 1.

FIG. 1 shows an exemplary prior art multi-spindle machine 10. FIG. 2 shows a side view of the multi-spindle machine 10 of FIG. 1. It should be understood that the present invention is useable with any multi-spindle machine in which it is desired to perform a pick-up operation and/or one or more back machining operations.

The machine components of prior art multi-spindle machines and their operations are well known. The multi-spindle machine 10 in FIG. 1 shows a work spindle 12 and a slide 14. The multi-spindle machine 10 in FIG. 2 shows a cam shaft 16, roller pin 18, collet operating lever 20, bar feed slide 22, and a collet operating slide 24.

Figure 3:
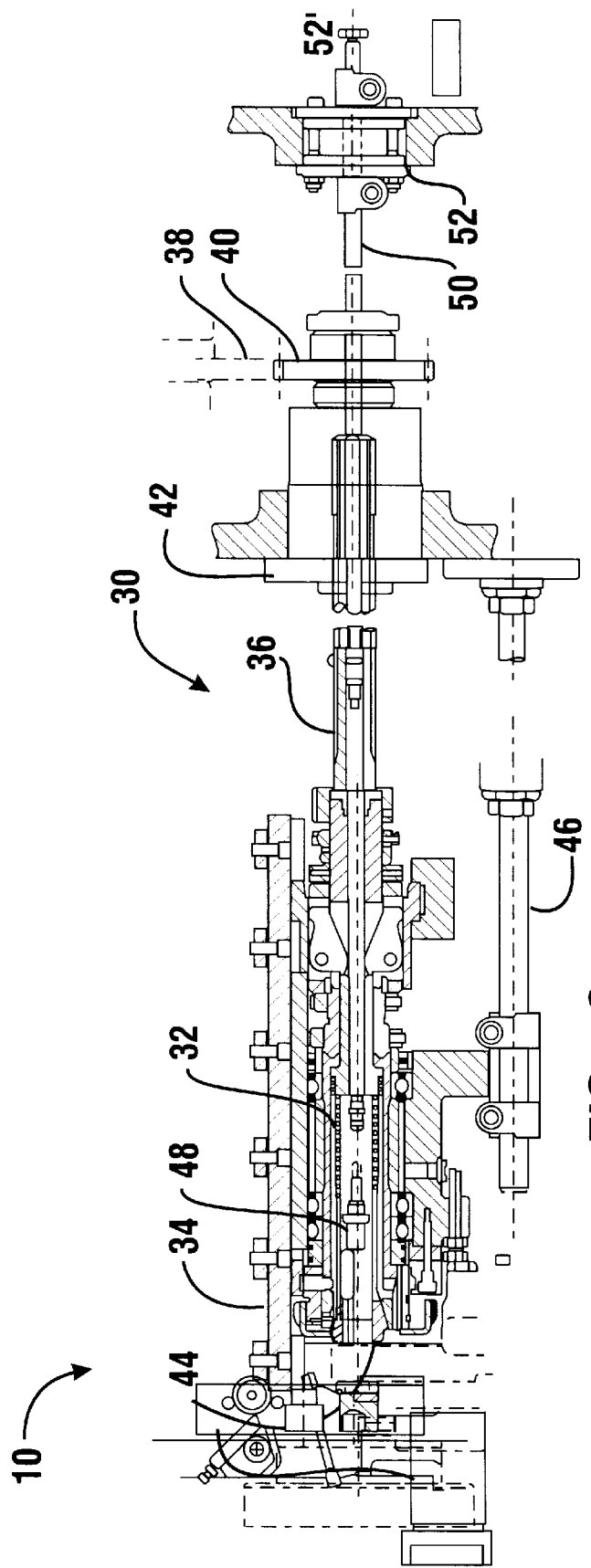
FIG. 3 shows a prior art pick-up attachment for a multi-spindle machine.

FIG. 3 shows a prior art pick-up attachment 30 for the multi-spindle machine 10. The pick-up attachment may be used for pick-up and back machining operations. The pick-up attachment includes a pick-up spindle 32. The pick-up spindle is mechanically driven through the gear train of the machine both rotationally and axially. The pick-up spindle is movable in supported connection with a subslide 34. The pick-up spindle is attached to a splined drive shaft 36 which is driven by a mechanical driving gear 38. Gear 38 rotates an attachment gear 40. The driving gear 38 is able to rotate the pick-up spindle 32 through rotation of gear 40. Drive shaft 36 is supported on the machine through a bearing housing 42. A pick-up collet 44 is attached to the pick-up spindle. The pick-up collet 44 is moved during each machine cycle adjacent to a work spindle collet (shown in outline) and to a back machining tool (shown in outline). The pick-collet is able to grip and eject a work piece component. The movement of the pick-up attachment is set according to cams which rotate during the machine cycle and which control the timing of the various components of the multi-spindle machine.

A pusher rod 46 moves the pick-up spindle in a direction parallel to the axis of the pick-up spindle 32. The pusher rod is mechanically driven axially responsive to the gear train of the machine through a mechanism including cams and levers. An ejector 48 is attached to an ejector rod 50. The ejector rod 50 is attached to a base 52. As the pick-up spindle is axially moved toward the base 52, then the ejector 48 operates to cause the work piece to be pushed out of the collet 44.

Figure 4:
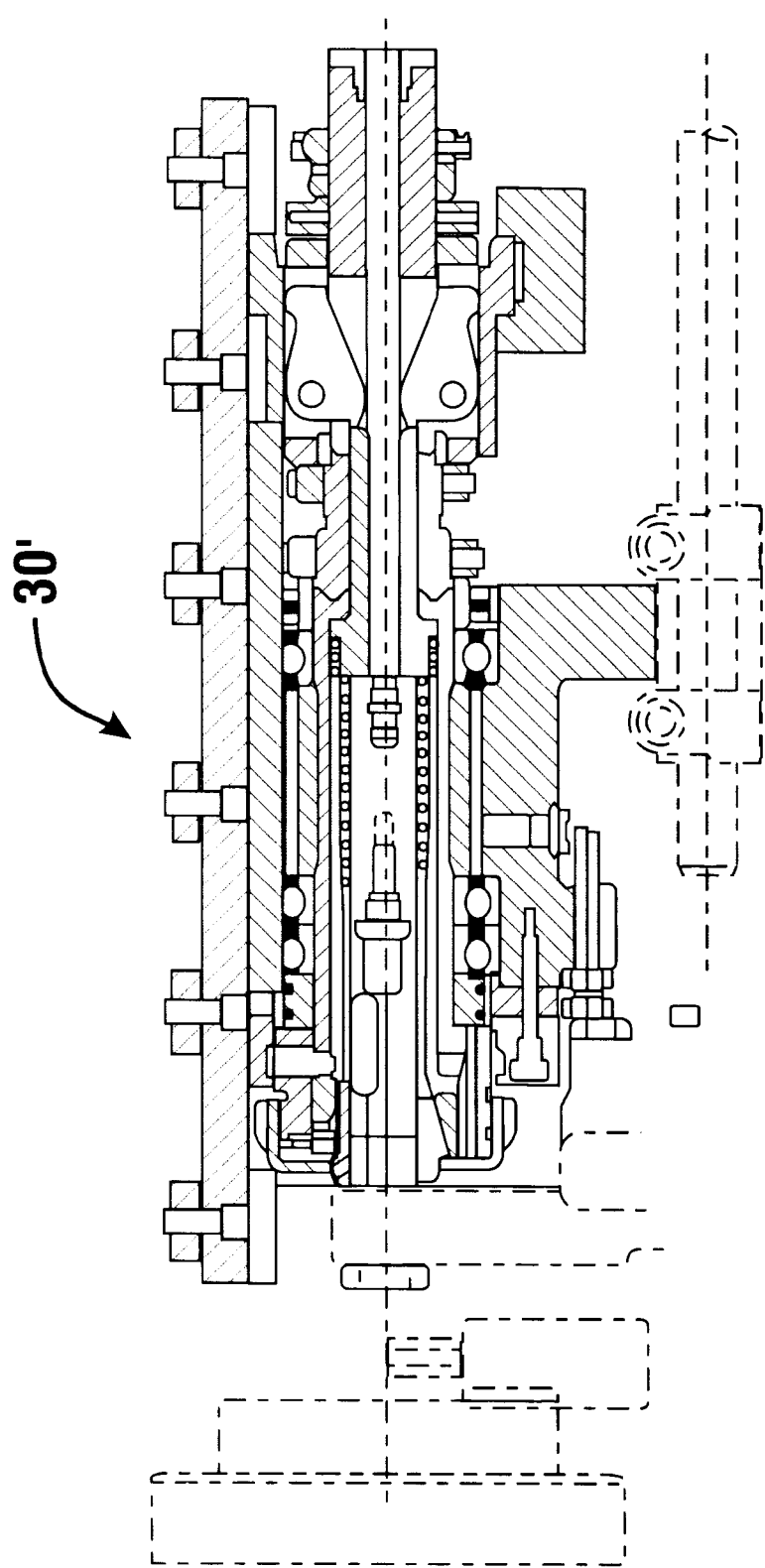
FIG. 4 shows a portion of a prior art pick-up attachment of FIG. 3.

FIG. 4 shows a prior art pick-up attachment 30' from FIG. 3 without the rotational and axial mechanical drives. As discussed more fully below, in exemplary embodiments of the present invention these drives are replaced by drives, such as servo motors, that provide expanded control of the pick-up spindle movement during pick-up, back machining, and drop operations.

Figure 5:
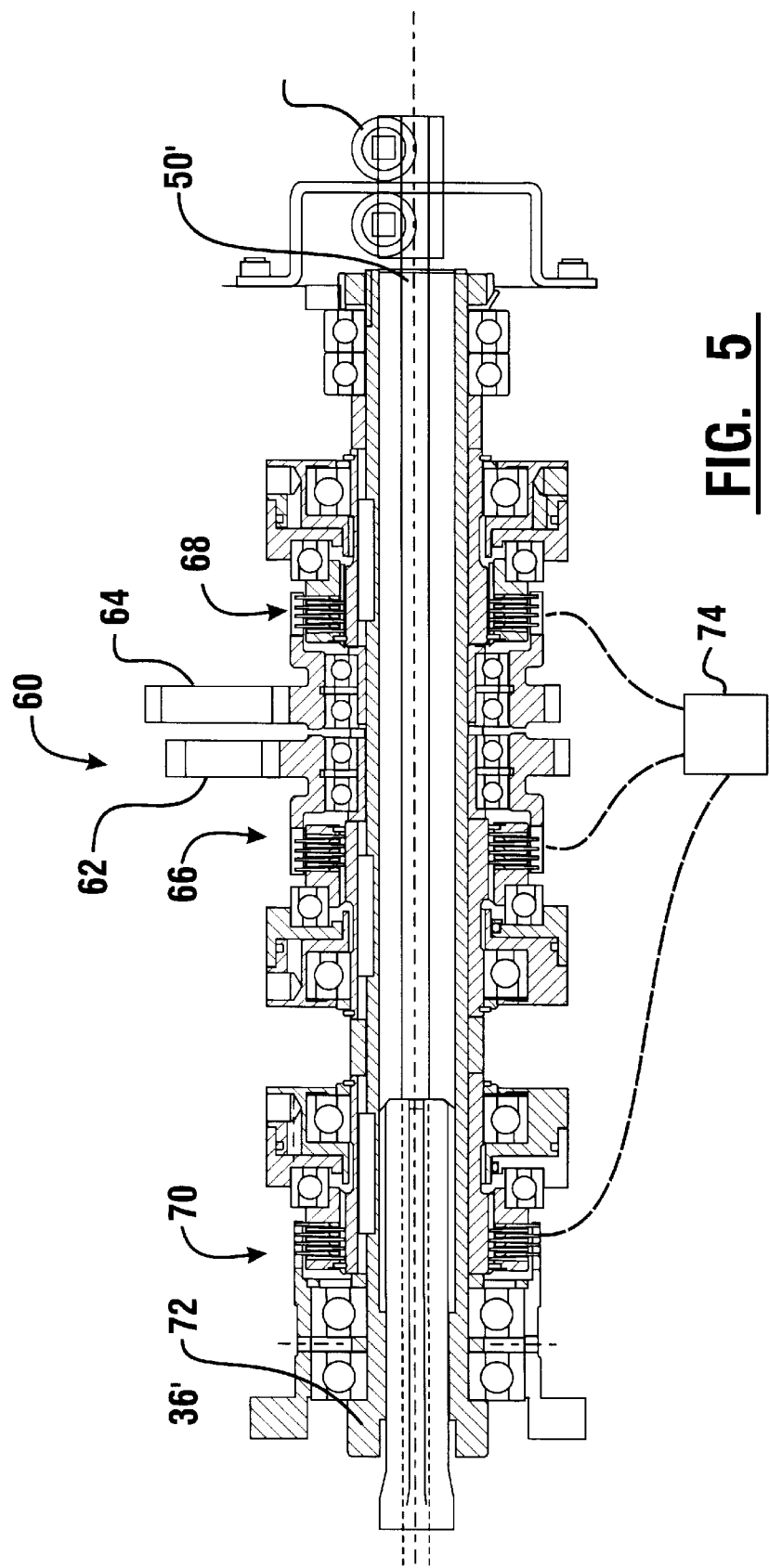
FIG. 5 shows a clutch/brake/gear assembly for a pick-up attachment.

FIG. 5 shows a clutch/brake/gear assembly 60 for a pick-up attachment used in an exemplary embodiment of the present invention. The clutch/brake/gear assembly 60 is operative to rotate and stop a pick-up shaft in a selectively controlled manner. The clutch/brake/gear assembly replaces an existing prior art mechanical rotational drive for a pick-up attachment in a multi-spindle machine. Hence, the pick-up attachment of FIG. 4 may be operatively connected with the clutch/brake/gear assembly of FIG. 5 for controlling a rotational speed and power to the pick-up shaft. Of course the arrangement of FIG. 5 may include an axial drive assembly for the pick-up attachment. The drive assembly could be arranged to selectively move the shaft 36' and/or the pick-up spindle linearly along the axial direction.

The clutch/brake/gear assembly 60 includes a plurality of driving gears 62, 64. Each driving gear is connected to a gear which is part of a housing on a respective clutch assembly 66, 68. Assembly 60 also includes a brake assembly 70. Each clutch assembly includes a plurality of friction disks. Upon the movement of an annular piston in response to application of fluid pressure, such as pneumatic pressure, the disks are axially compressed. Upon compression of the disks, rotational force is transmitted from the respective driving gear 62, 64, through the respective clutch assembly 66, 68, to a sleeve 72 which rotates shaft 36'. When pressure is relieved from the piston, the disks no longer transmit substantial driving force to the shaft. Shaft 36' is enabled to be rotated at different speeds by engaging clutch assembly 66 while clutch assembly 68 is disengaged, and then engaging clutch assembly 68 while clutch assembly 66 is disengaged.

In the exemplary embodiment brake assembly 70 includes a pneumatically actuated clutch similar to clutch assemblies 66 and 68. Brake assembly 70 operates to selectively engage the sleeve 72 in operatively fixed relation relative to the machine housing. As a result shaft 36' may be held rotationally stopped by disengaging clutch assemblies 66 and 68 and engaging brake assembly 70.

The drive shaft 36' is operatively connected with a pick-up spindle. The clutch assemblies enable the gears to be operatively engaged or disengaged with the drive shaft 36'. The arrangement of different gears enables the pick-up spindle to be rotationally driven at different speeds. The arrangement of different gears, clutches, and brake may be operatively controlled by a controller 74. In an exemplary embodiment the controller 74 is a programmable controller that is operative to selectively control pneumatic control valves (not shown). The pneumatic control valves control the application of fluid pressure to the clutch assemblies and the brake assembly. The controller is also in operative connection with an encoder or other synchronization sensor device which enables the controller to coordinate its operations with other operations carried out in the machine. As previously discussed, the controller may be used to determine and select the rotational speed of the pick-up spindle during pick-up, back machining, and drop operations. As shown in FIG. 5 an ejector rod 50' attached to a base 52' is operative to extend through sleeve 72 so that parts may be selectively ejected from the pick-up spindle.

In the exemplary embodiment the clutches are pneumatically actuated, multi-disc friction clutches. All of the clutches may be pneumatically actuated through solenoid valves which supply the fluid pressure to these clutches. In the exemplary embodiment the clutches may have an adjustable torque capacity directly dependent upon variable pressure. Therefore, these components are controllable independent of the machine cams or other devices on the multi-spindle machine. The ability to vary speeds and/or torque capacity of the pick-up spindle allows more efficient operation of the pick-up spindle and provides the ability to perform a wider variety of back machining operations. Further, the ability to selectively control speeds and torque capacities for the pick-up spindle enables better control of machining speeds during back machining operations. This provides more efficient operation and better quality control. The programming of controller 74 provides more reliable manufacturing operations with reduced potential for error in the pick-up, back machining and drop processes.

Figure 6:
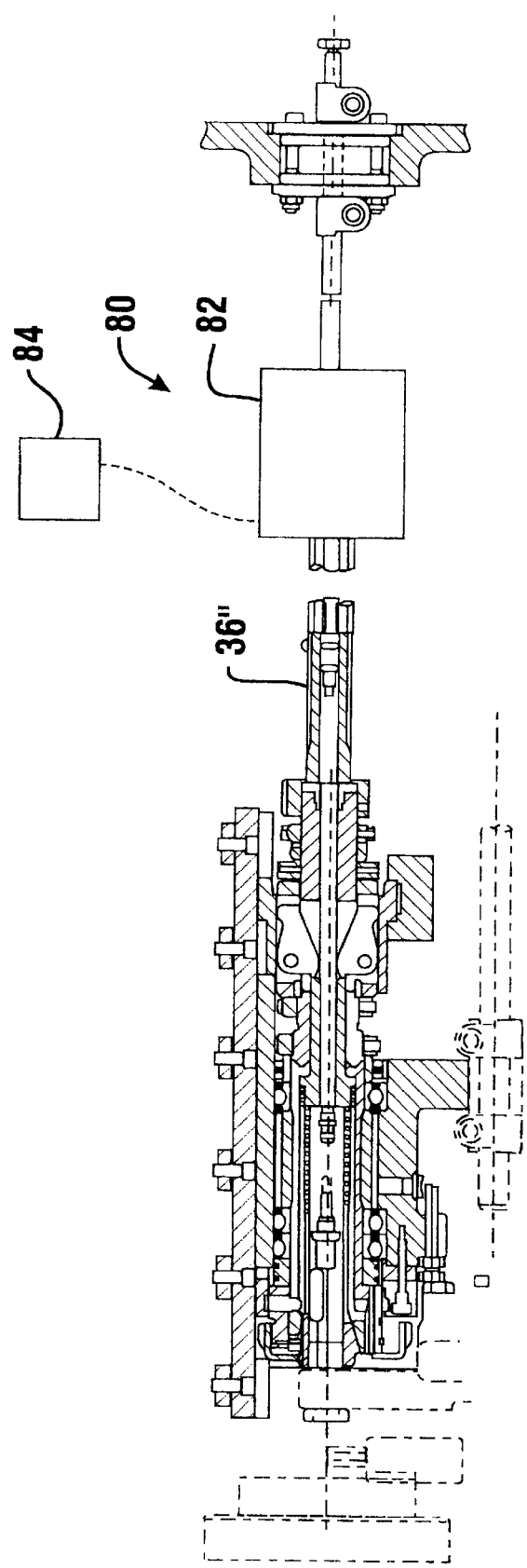
FIG. 6 shows a pick-up attachment for a multi-spindle machine, including a rotational drive motor assembly.

FIG. 6 shows a drive assembly 80 for a pick-up attachment in an alternate exemplary embodiment of the present invention. The drive assembly 80 rotationally drives a pick-up shaft 36". The drive assembly of the exemplary embodiment includes a servo motor 82. The drive assembly replaces an existing mechanical rotational drive in rotating a pick-up attachment of a multi-spindle machine. Hence, the pick-up attachment of FIG. 4 may be retrofit with the drive assembly 80 of FIG. 6 for selectively rotationally moving the pick-up shaft.

The servo motor 82 is able to rotationally drive the pick-up spindle shaft selectively at different speeds. As previously discussed, the servo motor is used for providing a controlled rotational speed of the pick-up spindle shaft. For example, one speed may be useful for initially gripping the work piece during part cut off. For example, the speed may be one to one with the work piece spindle speed for zero relative speed. A plurality of other speeds may be useful in back machining operations. The servo motor 82 is shown placed adjacent the pick-up spindle drive shaft 36". The servo motor may be operatively controlled by a controller 84. As previously discussed, the controller may be used to determine and selectively control the rotational speed of the pick-up spindle during pick-up, back machining, and drop operations.

Figure 7:
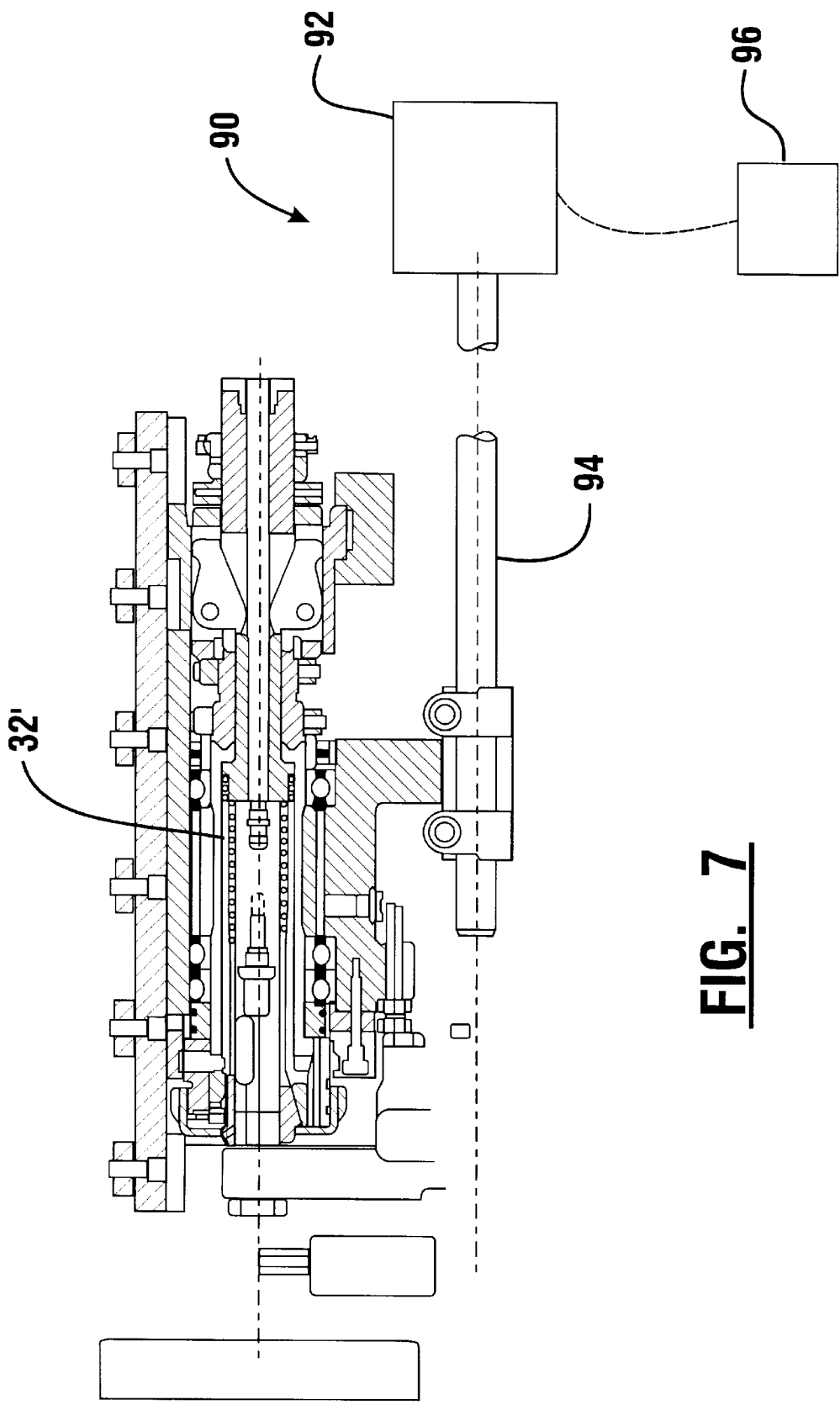
FIG. 7 shows a pick-up attachment for a multi-spindle machine, including an axial drive motor assembly.

FIG. 7 shows an axial drive assembly 90 for a pick-up attachment in an exemplary embodiment of the present invention. The drive assembly 90 selectively moves a pick-up spindle 32' linearly along an axial direction. The drive assembly may comprise a servo motor 92. The drive assembly may be used in place of an existing mechanical axial drive in a pick-up attachment of a multi-spindle machine. Hence, the pick-up attachment of FIG. 4 may be retrofit with the drive assembly 90 of FIG. 7 for selectively controlling the axial position and speed of axial movement of the pick-up spindle.

The servo motor 92 is able to move the pick-up spindle to different axial positions and at different speeds. The servo motor 92 is operatively connected to a pusher rod 94. The pusher rod is operatively connected to the pick-up spindle 32'. Hence, the servo motor 92 is operative to move the pusher rod 94 which in turn moves the pick-up spindle 32'. As previously discussed, the servo motor may be used for adjusting the axial position of the pick-up spindle. Therefore, the pick-up spindle and thus the work piece may be more accurately positioned. For example, one axial position may be useful for initially gripping the work piece during cut off. Thereafter the work piece may be selectively moved to other axial positions for one or more back machining operations. After completion of the back machining operations the part may be dropped in a desired axial location. The servo motor is operatively controlled by a controller 96. The controller may be used to determine and select the axial position and speed of the pick-up spindle during pick-up, back machining, and drop operations.

Figure 8:
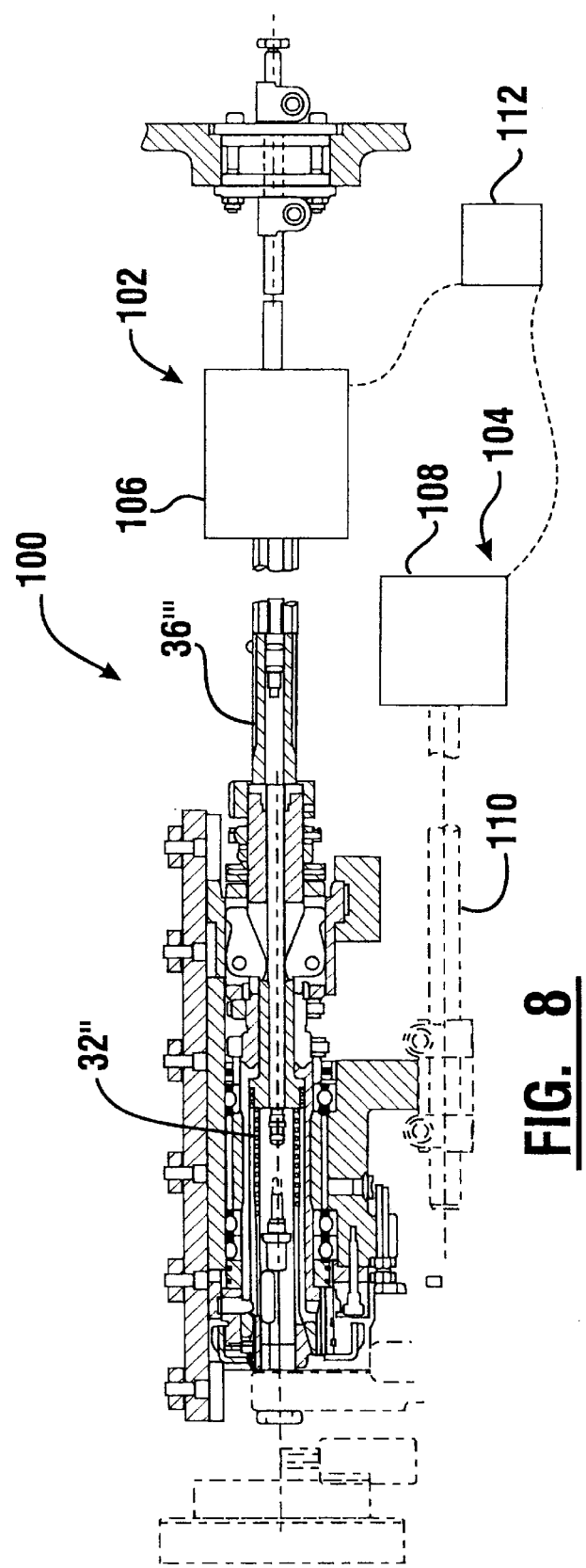
FIG. 8 shows a pick-up attachment for a multi-spindle machine, including both a rotational drive motor assembly and an axial drive motor assembly.

FIG. 8 shows a pick-up attachment 100 for a multi-spindle machine. The pick-up attachment 100 comprises both a rotational drive assembly 102 and an axial drive assembly 104. The rotational drive assembly 102 may be similar to the motor assembly 80 as previously described in regard to FIG. 6. Hence, the rotational drive assembly 102 may comprise a servo motor 106. The axial drive assembly 104 may be similar to the axial drive assembly 90 as previously described in regard to FIG. 7. Hence, the axial drive assembly 104 may comprise a servo motor 108. The servo motor 106 controls the rotational speed and position of pick-up shaft 36". The servo motor 108 is operative to axially move the pusher rod 110 which in turn axially moves the pick-up spindle 32". As a result servo motor 108 may control the axial speed and position of the pick-up spindle.

The drive assemblies 102, 104 may be operatively controlled by a controller 112. As previously discussed, the controller operates in accordance with programmed instructions. The controller is also in operative connection with one or more machine synchronization sensors, such as an encoder, to enable coordination with other operations being carried out by the machine. The controller operates to control the axial position and rotation speed of the pick-up spindle during pick-up, back machining, and drop operations.

It should be understood that the aforementioned controllers may comprise one or more computers or microprocessors. It should also be understood that the aforementioned controllers may be operatively connected to one or more electronic output devices or interfaces which enable control or coordination with other devices.

The exemplary embodiments of the present invention may also include stops for more accurate axial positioning of the pick-up spindle and collet. A pick-up stop may be used so that the forward motion of the collet can be more accurately positioned and positively axially stopped when the pick-up spindle is moved forward to pick a work piece before the work piece is cut off. A pick-up stop in effect limits the extent that a pusher rod may move a pick-up spindle. The pick-up stop permits the collet to be continually positioned at the same axial location during pick-up operations. Hence, the pick-up stop ensures consistent and reliable collet positioning for pick-up. Thus, every work piece can be picked up at the same axial position and in the same manner.

Figure 9:
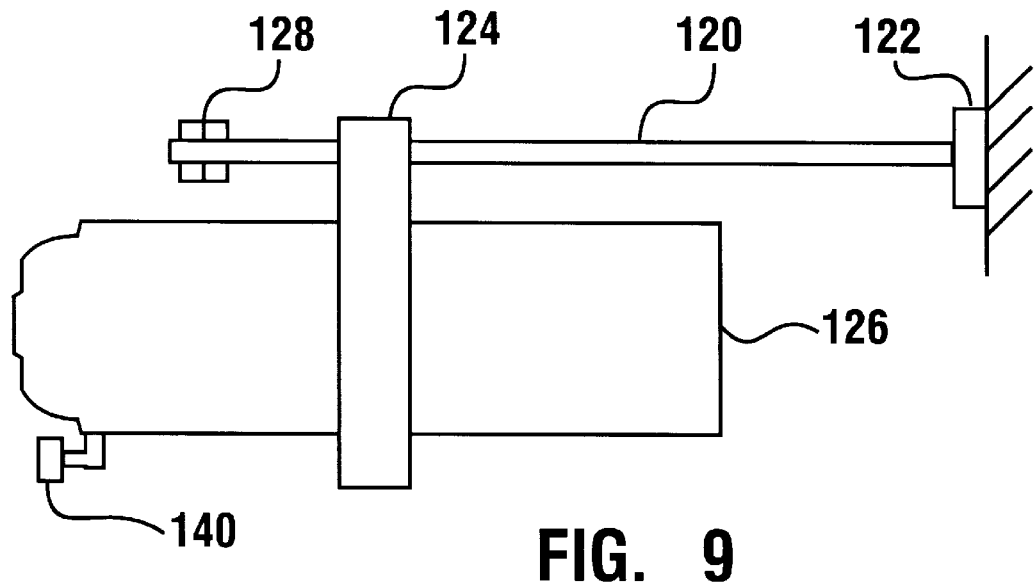
FIG. 9 shows a pick-up stop arrangement.
Figure 10:
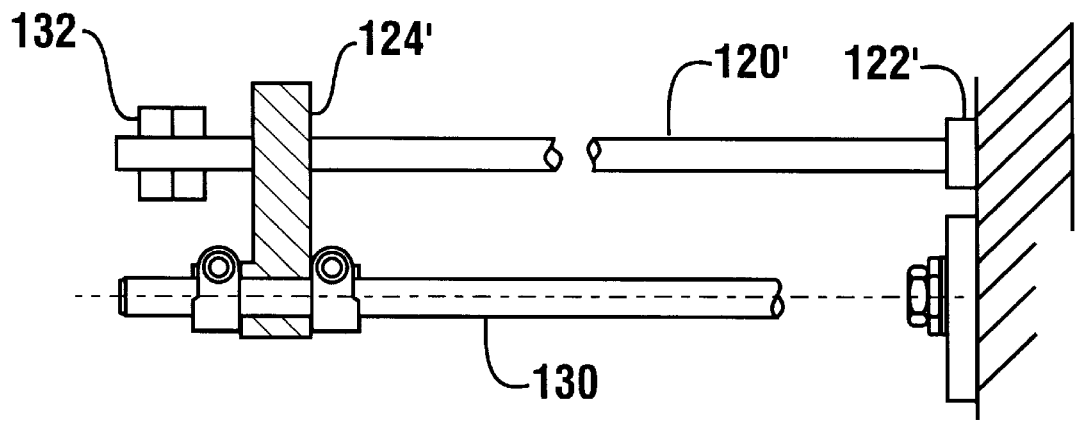
FIG. 10 shows another pick-up stop arrangement.

A pick-up stop arrangement can be located and supported at any machine area that permits its operation as described, without interfering with other machine operations. For example, the pick-up stop may be an external stop attached to a housing. FIGS. 9 and 10 respectively show pick-up stop arrangements.

FIG. 9 shows an external stop rod 120 attached to a fixed support 122. The stop rod 120 extends through a stop block 124 attached to a pick-up spindle housing 126. For clarity only the outline of the housing is shown. A pair of nuts 128 may be locked together adjacent an end of the stop rod to limit the axial travel of the pick-up spindle collet. The pusher rod operation and the arrangement shown is applicable to the pick-up attachments of FIGS. 5–8. Furthermore, the stop rod may be operatively attached to the drive shaft 36' of FIG. 5.

FIG. 10 also shows another arrangement of an external stop rod 120' attached to a fixed support 122'. The stop rod 120' and a pusher rod 130 are shown extending through a common or shared stop block 124'. The stop block may be fixedly attached to the housing of a pick-up spindle. A fastener arrangement 132 may be located adjacent an end of the stop rod. The pusher rod operation and the arrangement shown may be similar to that of FIG. 7 or FIG. 8.

Of course other fastening or securing elements other then nuts may be used to prevent the stop rod from extending out of the stop block. For example, the stop rod could have a bolt or fastening pin attached, such as by extending therethrough, adjacent an end thereof. The stop rod could also have a projection or flange welded at an end thereof. The stop rod could also have a clamp bolted at an end thereof. Furthermore, the forward advance of the pick-up spindle is not limited to using a stop block. It should be understood that instead of a stop block that other components such as a flange or projection may be used. Additionally, the present invention is not limited to using a stop rod and stop block combination. It is within the scope of this invention to use other variations and combinations for limiting the axial extent of the pick-up spindle. For example, instead of a stop block engaging with a stop rod, the stop block could engage with an elongated projection extending in a direction substantially perpendicular to and into the travel path of the pick-up spindle. Still other arrangements may include spring loaded projections engaging grooves, and others may include using one or more tapered components.

The pick-up stop may also be seen as a backup or safety stop that takes into consideration the possibility of machine components being out of sync or out of calibration. For example, mechanical components, due to wear, dirt, and/or other factors, may not permit the collet to be consistently axially positioned at its desired forward location for work piece pick-up. Thus, some work pieces could be back finished differently than other word pieces. This could lead to the discarding of work pieces. Thus, the pick-up stop arrangement of the present invention is an improvement over current machine pick-up operations.

Of course, after pick-up and cutoff other additional operations may be performed on the work piece, including back machining and dropping. Thus, an additional stop may be used to accurately position the pick-up spindle and collet for these additional operations. An additional stop may be used so that a backward motion of the collet can be more accurately positioned and positively axially stopped. For example, the work piece may need to be axially stopped at a location backward from the pick-up location yet not at its backward most location. For example, the work piece may need to be stopped at a first location for back machining and a second location for release. The additional stop (or stops) permits such operations to accurately occur.

An additional stop arrangement can be located and supported at any machine area that permits its operation as described, without interfering with other machine operations. For example, the additional stop may be an external stop attached to a spindle housing. An additional stop may be arranged to come into contacting relationship with a tool component or a cross slide. For example, while the tool is moved into a back finishing position a component thereof may also be moved into the travel path of the additional stop to engage the additional stop to stop the pick-up spindle at the predetermined position. FIG. 9 shows an additional stop arrangement.

FIG. 9 shows an additional stop 140 attached to the pick-up spindle housing 126. One or more additional stops can to be attached to a pick-up spindle housing. An additional stop may include a projection, flange, or other member that is adapted to operatively engage another component for stoppage of the pick-up spindle. As previously discussed, the other component that engages the additional stop may be moved transversely into the axial travel path of the additional stop. The engaging component may constitute a back machining tool attachment. Of course the previously discussed stop block 124 may also be used as an additional stop.

It should be understood that the stops for use in the present invention are not limited to mechanical stops but may also include pressure, electrical and/or magnetic assisted stops. Furthermore, the stops may have structure or may have material thereon which permits the stops to more accurately position the collet. For example, a stop may include a cushioning or dampening material which minimizes the bounce back of the pick-up spindle from the stop.

The exemplary embodiments of the present invention may also include an alignment arrangement for more accurate rotational positioning of the pick-up collet. The present invention provides for a synchronized pickup collet that can also be rotationally stopped in an oriented position so that additional operations may be performed. The collet and/or spindle is capable of being stopped in a repeatable fixed angular orientation. Additional operations may include cross drilling a hole in a hex flat and tapping. Thus, the collet may be set up to rotate incrementally at 90 degrees. For example, the collet may be repeatedly stopped at a fixed rotational orientation by moving a sleeve forward over a flat.

Furthermore, the pick-up collet may need to be initially aligned in a specific starting rotational position in order to accurately pick-up a work piece. For example, a work piece may have a hex shaped arrangement. The present invention permits a pick-up collet to have a corresponding hex shaped arrangement that matches the hex shaped work piece. Thus, with the present invention a more accurate, non-damaging, and firmer grip on the work piece may be achieved.

An alignment device may be used to properly position the rotational angle of a collet for pick-up of a work piece. For example, with a hex shaped work piece the collet could be positioned in one of six rotational positions. The alignment device permits the collet to be repeatedly aligned with hex shaped work pieces for pick-up. Hence, the alignment device ensures consistent and reliable collet positioning for pick-up. Thus, every work piece can be picked up at the same rotational position and in the same manner.

In multi-spindle machine operation the drive gear is interlinked with the work piece spindle. Hence, the drive gear timing corresponds to the work piece spindle timing. That is, the location and timing of work piece hex flats can be determined for alignment and pick-up with a hex shaped collet. The orientation of the drive gear can be corresponded with the initial orientation of the hex flats. For pick-up operation the current orientation of the hex flats can be determined by ascertaining the current orientation of the drive gear. Hence, the pick-up spindle drive, through use of additional aligning gearing and/or cams in operative relation with the drive gear, can be re-calibrated so that the pick-up spindle is driven to match the hex shaped collet with the hex shaped work piece for pick-up thereof.

Figure 11:
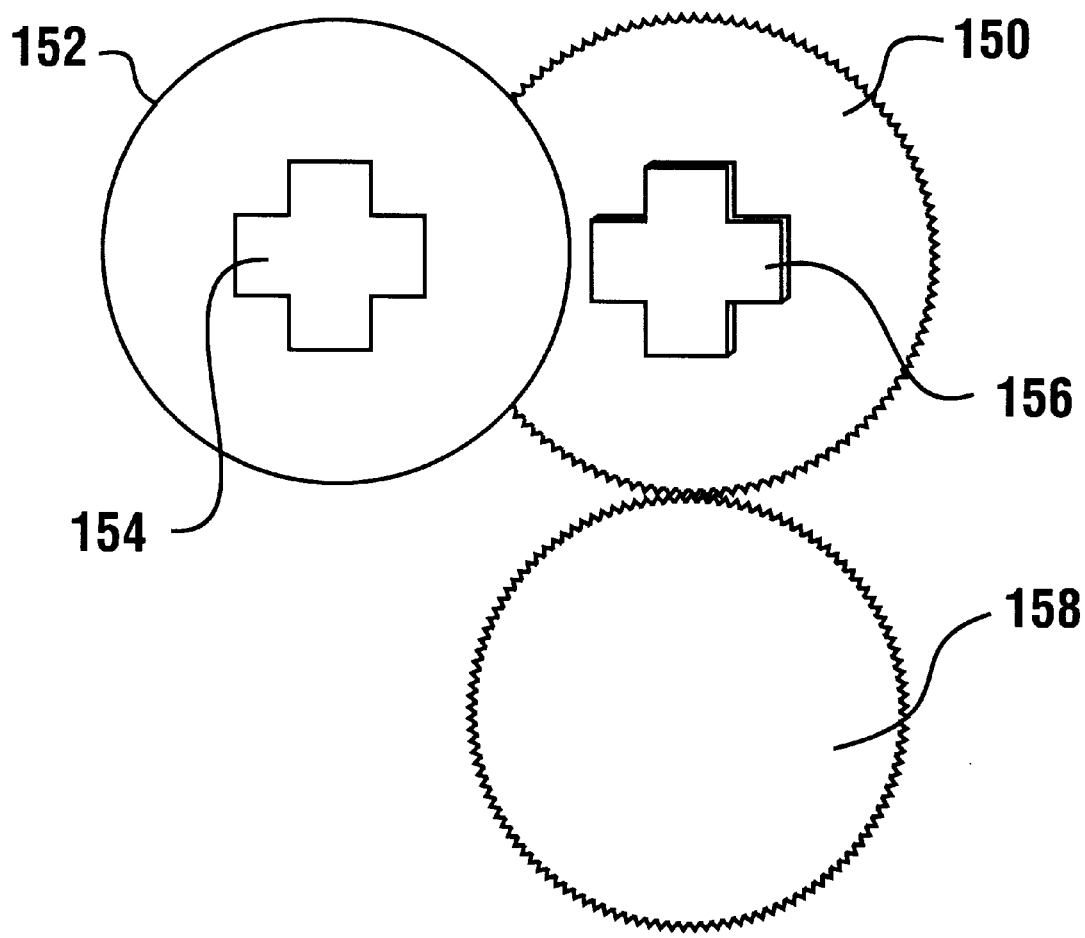
FIG. 11 shows an aligning gearing arrangement.

FIG. 11 shows an aligning gearing arrangement including a drive gear 150 and an aligning drive 152. An opening 154 in the aligning gear enables the aligning gear to slide onto a notch 156 on the drive gear. The opening and notch may be tapered. Another relational gear 158 is also shown. Upon full engagement of the two gears, the aligning drive could directly or indirectly move the pick-up spindle into a realigned rotational pick-up position. The aligning drive acts to help transfer the rotational orientation of the work piece to the pick-up collet drive so that the two can be in alignment. The aligning drive 152 may include gears, pulleys, notches, or other aligning features. Of course the shown opening and notch relationship is only exemplary and other aligning relationships are within the scope of the invention.

Other alignment device may be used to match the rotational alignment of the collet and work piece. For example, an alignment device may include matching angular sensor data from the pick-up spindle with angular sensor data from the work piece spindle. Furthermore, a laser device, such as a laser positional finder, may be used in conjunction with a computer to determine the angular orientation of the work piece flats. The pick-up collet may then be movably aligned with the flats. During an alignment process the pick-up spindle may be slightly braked to correctly align the collet with the flats.

In another alignment process the ejector or ejector rod may include an attached component to aligningly engage a collet sleeve. The ejector rod, by being in alignment with the work piece spindle and by engagement with the collet sleeve, would also move the collet and/or pick-up spindle into proper alignment. Ejector rod aligning arrangements may include spring loaded projections engaging grooves, and others may include using one or more tapered components. For example, when the work piece is pushed out of the collet by the ejector, the ejector could simultaneous realign the collet. The collet could then be held in that properly aligned rotational position until the next work piece is picked.

In another alignment process the brake assembly could have built therein a collet realigner. The brake assembly could include a releasable member, e.g., a latch, which only engages a corresponding opening, e.g., a slot, in the spindle when the spindle is rotating lower than a predetermined speed. The speed could be set so that no damage to machine components would occur. Thus, braking the spindle below a set speed would automatically realign the collet.

Other alignment devices and techniques may also be used, including optical sensors and magnetic alignment.

The present invention provides a novel multi-spindle machine system. The present invention provides a novel pick-up attachment that improves the efficiency and quality of picking-up, back machining, and dropping work pieces. Hence, the present invention improves the efficiency and quality of work piece production in a multi-spindle machine. The novel pick-up attachment of the present invention can also be applied to a multi-spindle machine to provide more reliable and accurate handling of a work piece. More control is permissible during the handling of a work piece when performing multi-spindle machine operations, such as pick-up, back machining, and dropping. The present invention also provides for the rotational speed of a work piece to be adjusted as necessary to perform a desired operation. The rotation of a work piece may even be stopped. The present invention also provides for the rotational and axial positions of a work piece to be adjusted as necessary to perform desired operations. The present invention also provides for the axial speed of a work piece to be adjusted as necessary to perform a desired operation. The work piece may be stopped at a selected position. The present invention also provides for the selective axial and rotational positioning of a pick-up collet. The present invention ensures consistent and reliable collet positioning for work piece pick-up and handling operations.

The method of using the novel pick-up attachment of the present invention enables selectively controlling the rotational and axial positions and speeds of a work piece during pick-up, back machining, and dropping operations. The exemplary embodiments also facilitate conducting a plurality of back machining operations on a work piece in the multi-spindle machine.

A further advantage of the novel pick-up attachment of the present invention is that it can be used with current multi-spindle machines. It should be immediately apparent that the present invention is equally applicable to any multi-spindle machine capable of employing operations such as work piece pick-up, back machining, and dropping. Therefore, existing multi-spindle machines may be retrofit with the novel pick-up attachment of the present invention. For example, the novel pick-up attachment and system of the present invention is applicable to a Wickman, National Acme and New Britain multi-spindle machine. In an exemplary embodiment the novel pick-up attachment and system of the present invention is applicable to a Wickman 1"–6 multi-spindle machine.

Thus, a multi-spindle machine employing the novel pick-up attachment of the present invention achieves the above stated objectives, eliminates difficulties encountered in the use of prior devices and systems, solves problems and attains the desired results described herein.

In the foregoing description, certain terms have been used for brevity, clarity and understanding, however, no unnecessary limitations are to be implied therefrom because such terms are for descriptive purposes and are intended to be broadly construed. Moreover, the descriptions and illustrations herein are by way of examples and the invention is not limited to the details shown and described. Further, in the following claims any feature that is described as a means for performing a function shall be construed as encompassing any means capable of performing that function and shall not be limited to the particular means shown in the foregoing description or mere equivalents.

Having described the features, discoveries and principles of the invention, the manner in which it is constructed and operated, and the advantages and useful results attained; the new and useful structures, devices, elements, arrangements, parts, combinations, systems, equipment, operations and relationships are set forth in the appended claims.

I claim:

1. A multiple spindle machine pick-up attachment comprising:
   a pick-up spindle, wherein the spindle has an axis, wherein the spindle is adapted to be rotationally driven about the spindle axis,
   a pick-up collet, wherein the collet is operatively connected to the pick-up spindle, and wherein the collet is adapted to hold a work piece,
   a rotational drive assembly, wherein the rotational drive assembly is operative to rotationally drive the spindle about the spindle axis, and wherein the rotational drive assembly is operative to rotationally move the collet at different speeds,
   a controller, wherein the controller is operable to control operation of the rotational drive assembly.

2. The multiple spindle machine pick-up attachment according to claim 1 further including a axial drive assembly,
   wherein the axial drive assembly is operative to axially drive the collet in a direction generally parallel to the spindle axis,
   wherein the controller is operable to control operation of the rotational drive assembly and the axial drive assembly.

3. The multiple spindle machine pick-up attachment according to claim 1 further including a drive shaft, wherein the shaft is adapted to be rotationally driven, wherein the shaft is in operative connection with the spindle, wherein the shaft is operative to rotationally move the collet at different speeds, and wherein the rotational drive assembly is operative to rotationally drive the shaft.

4. The multiple spindle machine pick-up attachment according to claim 3
   wherein the rotational drive assembly includes a motor,
   wherein the motor is in operative connection with the shaft, wherein the motor is operative to rotationally drive the shaft, and wherein the shaft is operative to rotationally drive the spindle.

5. The multiple spindle machine pick-up attachment according to claim 4 wherein the motor comprises a rotational servo motor.

6. The multiple spindle machine pick-up attachment according to claim 2
   wherein the axial drive assembly includes a driven member and a motor, wherein the driven member is in operative connection with the collet,
   wherein the driven member is adapted to be axially driven, wherein the motor is in operative connection with the driven member, wherein the motor is operative to axially drive the driven member, and wherein the driven member is operative to axially move the collet.

7. The multiple spindle machine pick-up attachment according to claim 6 wherein the motor comprises an axial servo motor.

8. The multiple spindle machine pick-up attachment according to claim 7 wherein the driven member includes a pusher rod, and wherein the motor is operative to axially drive the pusher rod.

9. The multiple spindle machine pick-up attachment according to claim 8 further including a spindle housing,
   wherein the driven member includes a block attached to the spindle housing,
   wherein the pusher rod is operatively connected to the block.

10. The multiple spindle machine pick-up attachment according to claim 1 wherein the spindle is adapted to be axially driven in a direction generally parallel to the spindle axis,
   a rotational servo motor, wherein the rotational servo motor is in operative connection with the spindle, wherein the rotational servo motor is operative to rotationally drive the spindle at different speeds, an axial servo motor, wherein the axial servo motor is in operative connection with the spindle, wherein the axial servo motor is operative to axially drive the spindle, wherein the controller is operable to control operation of the rotational servo motor and the axial servo motor.

11. The multiple spindle machine pick-up attachment according to claim 3 wherein the spindle includes a drive sleeve, wherein the drive sleeve is adapted to be rotationally driven, wherein the drive sleeve is in operative connection with the drive shaft, wherein the drive sleeve is operative to rotationally drive the drive shaft.

12. The multiple spindle machine pick-up attachment according to claim 11 further including a clutch assembly, wherein the rotational drive assembly includes a drive gear, wherein the drive sleeve is adapted to be rotationally driven by the drive gear, wherein the clutch assembly comprises at least one clutch, wherein the clutch assembly is operable to engage and disengage the drive gear with the drive sleeve.

13. The multiple spindle machine pick-up attachment according to claim 12 further including a brake assembly, wherein the brake assembly comprises at least one brake, wherein the brake assembly is operable to slow rotational speed of the drive sleeve, wherein the controller is operable to control operation of the clutch assembly and the brake assembly.

14. The multiple spindle machine pick-up attachment according to claim 13 wherein the clutch assembly comprises a first clutch and a second clutch, wherein the drive gear comprises a first drive gear and a second drive gear, wherein the first clutch is operable to engage and disengage the drive sleeve to the first drive gear, wherein the drive sleeve is adapted to be rotationally driven by the first drive gear at a first speed, wherein the second clutch is operable to engage and disengage the drive sleeve to the second drive gear, wherein the drive sleeve is adapted to be rotationally driven by the second drive gear at a second speed, and wherein the second speed is different from the first speed.

15. The multiple spindle machine pick-up attachment according to claim 6 further including a stop assembly, wherein the stop assembly is operative to prevent movement of the collet beyond a first axial position in a first axial direction.

16. The multiple spindle machine pick-up attachment according to claim 15 wherein the stop assembly includes a stop rod with a stopping member adjacent an end thereof.

17. The multiple spindle machine pick-up attachment according to claim 16 further including a spindle housing and a block attached thereto, wherein the block is slidable along the stop rod, wherein engagement of the block with the stopping member prevents movement of the spindle beyond a first axial position in a first direction, wherein the first axial position comprises a work piece pick-up position.

18. The multiple spindle machine pick-up attachment according to claim 16 wherein the stop rod is in operative connection with the drive shaft, wherein the stop rod is operative to prevent movement of the drive shaft beyond the first axial position in the first direction.

19. The multiple spindle machine pick-up attachment according to claim 15 further including an additional stop assembly, wherein the additional stop assembly is operative to prevent movement of the collet beyond a second axial position in a second axial direction.

20. The multiple spindle machine pick-up attachment according to claim 19 further including a spindle housing, wherein the additional stop assembly is operatively connected to the spindle housing, and wherein the second axial position comprises a work piece back machining position.

21. A method for rotationally driving a pick-up spindle of a multiple spindle machine, the multiple spindle machine having a pick-up attachment the pick-up attachment including a pick-up collet in operative connection with the spindle, wherein the collet is adapted to hold a work piece, wherein the spindle has an axis, a rotational drive assembly operative to rotationally drive the spindle about the spindle axis, wherein the rotational drive assembly is operative to rotationally drive the collet at different speeds, a controller operable to control operation of the rotational drive assembly, the method comprising:

operating the rotational drive assembly to rotate the spindle at a first speed, operating the rotational drive assembly to rotate the spindle at a second speed, wherein the second speed is different from the first speed, and controlling operation of the rotational drive assembly with the controller.

22. The method according to claim 21 wherein the pick-up attachment further includes an axial drive assembly, further comprising operating the axial drive assembly to axially drive the collet in a direction generally parallel to the spindle axis, and controlling the operation of the rotational drive assembly and the axial drive assembly with the controller.

* * * * *